United States Patent
Endsley et al.

(10) Patent No.: US 6,299,391 B1
(45) Date of Patent: Oct. 9, 2001

(54) BORING TOOL ASSEMBLY

(75) Inventors: John C. Endsley, Washington; Michael H. Hinrichsen, Goodfield, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/332,738

(22) Filed: Jun. 14, 1999

Related U.S. Application Data

(63) Continuation-in-part of application No. 08/968,247, filed on Nov. 12, 1997, now Pat. No. 5,957,630.

(51) Int. Cl.[7] ................... B23B 3/04; B23B 29/03
(52) U.S. Cl. ................... 408/83; 408/57; 408/705
(58) Field of Search .................. 408/83, 705, 714, 408/57

(56) References Cited

U.S. PATENT DOCUMENTS

| | | | |
|---|---|---|---|
| 2,283,497 | * 5/1942 | Fields et al. | 408/57 |
| 2,334,795 | * 11/1943 | Smith | 408/83 |
| 4,666,350 | * 5/1987 | Nicholas | 408/83 |
| 5,150,496 | 9/1992 | Bromley . | |
| 5,957,630 | 9/1999 | Endsley et al. . | |

FOREIGN PATENT DOCUMENTS

1315155-A * 6/1987 (SU) ...................................... 408/83

* cited by examiner

Primary Examiner—Steven C. Bishop
(74) Attorney, Agent, or Firm—J. W. Burrows

(57) ABSTRACT

A boring tool assembly is provided and has a cutting tool mounted on one end thereof and permits the boring of a straight hole through a member. The boring tool assembly includes a boring bar having integral guide members disposed thereon that follows behind the cutting tool and maintains contact with the machined surface just cut in order to keep the cutting tool in proper alignment. To permit the continued use of the boring bar after the outer diameter of the cutting tool has been reduced due to wear, each of the integral guide members are resiliently mounted on the boring bar. This permits the guide members to collapses inwardly to maintain a perfect fit with the pilot pore while maintaining bearing contact of the guide members with the pilot bore. The positive bearing contact helps to provide a dampening feature for the boring bar and a spring type force for the hardened guide members. A resilient member is mechanically secured in respective slots to provide the resilient mounting of the hardened guide members to the boring bar.

13 Claims, 3 Drawing Sheets

BORING TOOL ASSEMBLY

This is application is a continuation-in-part of application Ser. No. 08/968,247 filed Nov. 12, 1997 now U.S. Pat. No. 5,957,630.

TECHNICAL FIELD

The subject invention relates generally to a boring tool that is typically used to bore deep holes and more particularly to a boring tool assembly that has guides to aid in assuring that the boring tool continues to bore in a straight line even when the outer diameter of the cutting tool reduces in size due to wear or re-sharpening.

BACKGROUND ART

Boring tools are well known in the art. Many of these known boring tools have a cutting tool disposed on one end thereof for boring a hole in a material, such as steel, aluminum or cast iron. In long bored holes, the boring tool has a tendency to "wander" as opposed to cutting in a straight line. This may be attributed to the material being cut varying in toughness or hardness causing the boring tool to take the path of least resistance. Many times the hole to be bored has been partially defined by the casting or forging process to form a cored hole. These cored holes are not always disposed in the proper location or there are interrupted surfaces that the cutting tool must cut. In these situations, the cutting tool may "wander" and not cut in a straight line, especially if the boring bar is long. In order to offset this "wandering" of the cutting tool, it is known to provide a pilot stem on the forward end of the boring tool that is positioned in a pilot hole. With the pilot stem in the pilot hole, the cutting tool is maintained in its proper location. This type of tool requires boring a pilot bore hole first to receive the pilot stem. Additionally, it is known to provide separate bearing assemblies that are mounted on the boring tool behind the cutting tool. This also works to keep the cutting tool aligned properly. These bearing assemblies are normally more bulky in size and also are separate elements that must be mounted on the boring tool. It is also known to provide individual guides within the bearing assembly that can be replaced. Additionally, springs or other resilient members may be placed behind the individual guides of the bearing assembly in order to allow the bearing member to fit into holes of varying sizes and/or to compensate for wear of the cutting tool. Since these known bearing members are short in length, they are not practical when boring holes that are interrupted by cavities, such as is present when boring cored holes in a valve body for a valve spool. It is also known to use a boring tool mounted on a boring bar with rigidly attached guides to enlarge previously machined holes. It is desirable to provide a boring tool that can be rebuilt without having to apply heat, such as that needed when removing and installing brazed in guides. In known boring bars having a length to cutting tool diameter of 6:1 or greater, the known boring bars have poor cutting performance due to chatter caused by the boring bar not being properly supported.

The present invention is directed to overcoming one or more of the problems as set forth above.

DISCLOSURE OF THE INVENTION

In one aspect of the present invention, a boring tool assembly is provided and adapted to have a cutting tool disposed on one end thereof to cut or bore a hole of a predetermined size in a member. The boring tool assembly includes a longitudinal extending boring bar having a plurality of slots defined therein about its circumference along its longitudinal length. Each of the slots has a top portion of a predetermined width, a bottom portion and opposed side walls. A hardened guide member having a predetermined width that is substantially the same as the width of the upper portion of the respective slots and is disposed in the top portion of each of the respective slots of the plurality of slots. A resilient member is also disposed in the bottom portion of each of the respective slots. Each of the respective resilient members is mechanically connected within the bottom portion of the associated slot and secured to the associated hardened guide member.

BEST MODE FOR CARRYING OUT THE INVENTION

Figure 1:
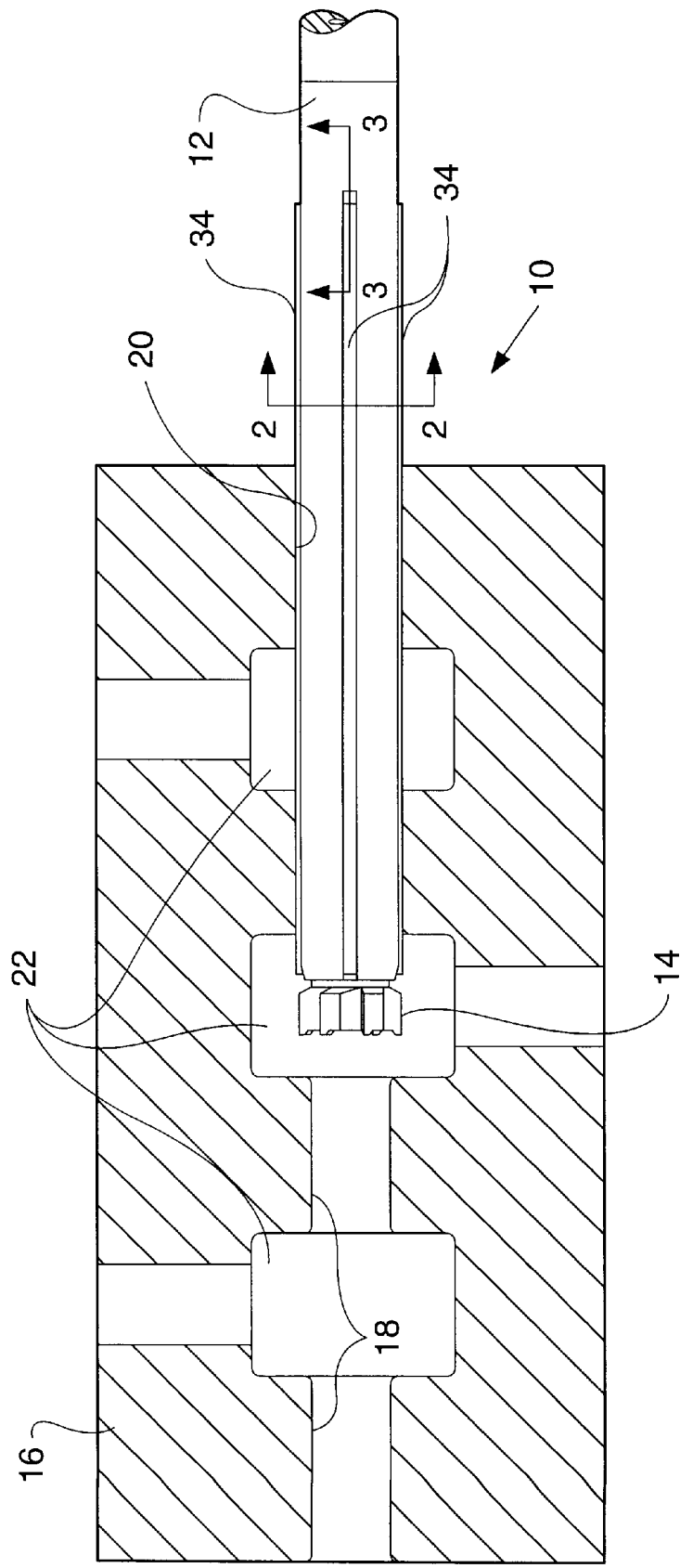
FIG. 1 is a diagrammatic representation of an embodiment incorporating the subject invention.
Figure 2:
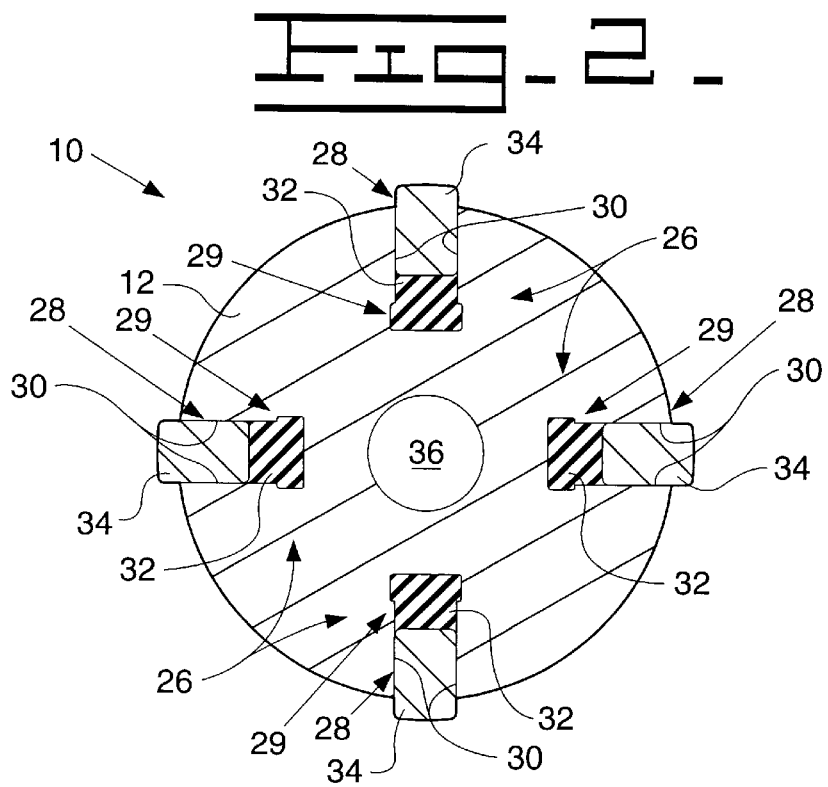
FIG. 2 is a cross-sectional view taken along the line 2—2 of FIG. 1.
Figure 3:
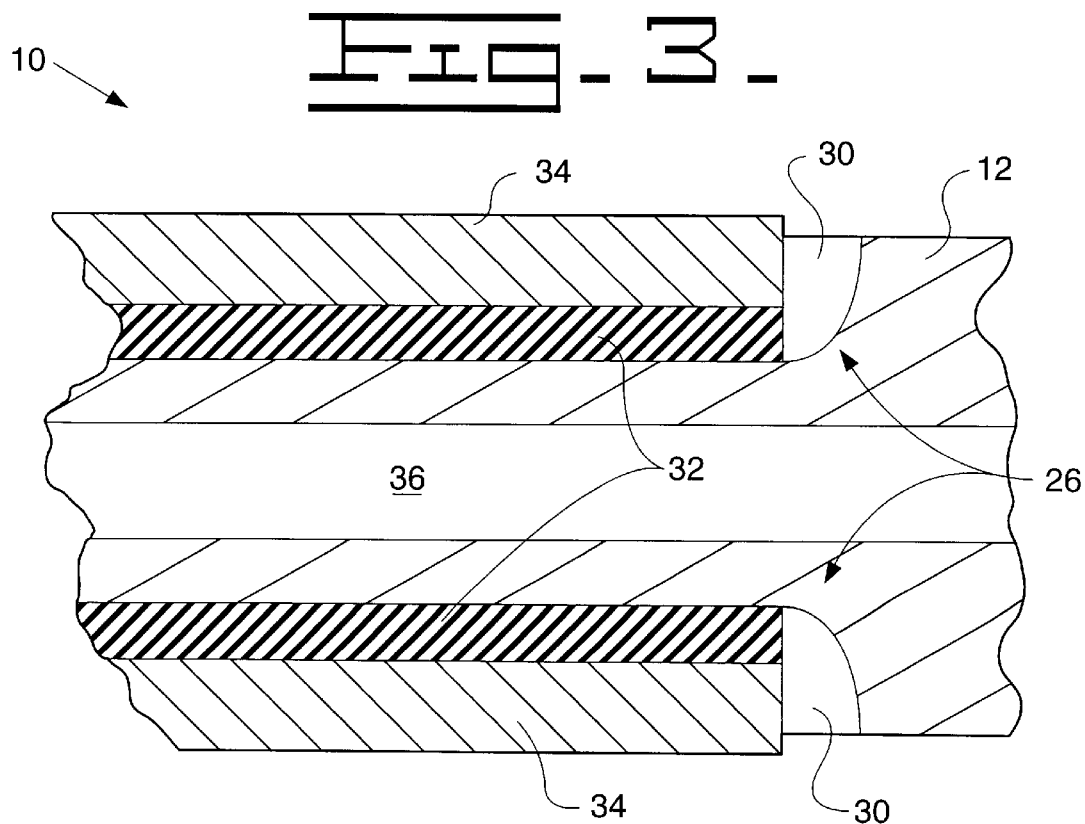
FIG. 3 is a partial section taken along line 3—3 of FIG. 1.

Referring to the FIGS. 1–3 of the drawings, a boring tool assembly 10 is illustrated and includes a longitudinally extending boring bar 12 and a cutting tool 14 attached to one end thereof. The boring tool assembly 10 is illustrated in its operative position boring a hole in a member 16, such as a valve body. The valve body 16 defines a cored passage 18 therein having material that is machined away by the cutting tool 14 to define a machined bore 20. As is typical with valve bodies, annular cavities 22 are defined therein spaced from one another along the longitudinal axis of the cored passage 18. Each of the annular cavities 22 is larger than the cored passage 18. Consequently, as the cutting tool 14 is machining the cored passage 18, the cutting tool 14 enters and exits the respective annular openings 22. It is well known that the longitudinal length of the annular cavities in different valve bodies varies with different valve designs. Therefore, many times the outer diameter of the cutting tool 14 is totally out of contact with the machined bore 20.

A plurality of slots 26 is defined in the boring bar 12 spaced from one another around the circumference and extending along the longitudinal length of the boring bar. For simplicity of illustration, only four slots are illustrated even though at least six slots are normally used. It is recognized that the number of slots 26 in the boring bar 12 could be changed without departing from the essence of the subject invention.

Each of the slots 26 has an upper portion 28, a lower portion 29 and opposed side walls 30. The longitudinal length of each slot 26 is longer than the diameter of the boring bar 12 and each slot 26 originates at a location generally adjacent the cutting tool 14. Preferably, each of the slots 26 is several times longer than the diameter of the boring bar 12. The required length of the respective slots generally depends on the length of the hole to bore and/or the length of the interrupted surfaces to be machined.

A resilient member 32 is disposed in respective ones of the slots 26 and secured thereto. In the subject embodiment, the resilient members 32 are mechanically connected to the bottom portion 29 of the respective slots 26 and contained between the opposed side walls 30. It is recognized that a mechanical connection includes bonding. The resilient members 32 can be made of various types of materials, such as, for example, rubber or polyurethane. Preferably, if rubber is used, the durometer thereof should be 50d or higher to ensure the proper stiffness.

A hardened guide member 34 is disposed in respective ones of the slots 26 and secured to the associated resilient member 32. In the subject embodiment, the respective hardened guide members 34 may be bonded or mechanically connected to the associated resilient member 32. Each of the hardened guide members 34 extends outwardly from the associated slot 26 and has an arcuate surface that substantially matches the surface of the machined bore 20. Even though the respective hardened guide members 34 are illustrated as being one piece, it is recognized that each could be composed of several segments. The overall longitudinal length of the hardened guide members 34 is several times the diameter of the cutting tool 14. The subject arrangement provides a more stable boring bar without undue chatter during cutting. The hardened guide members 34 may be made from a steel alloy, ceramic or carbide material. A typical ceramic compound may be, for example, a silicon nitride, zirconia, or alumina.

A passage 36 is defined within the boring bar 12 along its longitudinal length. The passage 36 permits coolant flow to be directed through the boring bar 12 to a location adjacent the cutting tool 14. Additional relief grooves (not shown) could be defined along the longitudinal length of the boring bar 12 between the respective slots 26 in order to permit an escape route for the cut material and the cooling flow.

Figure 4:
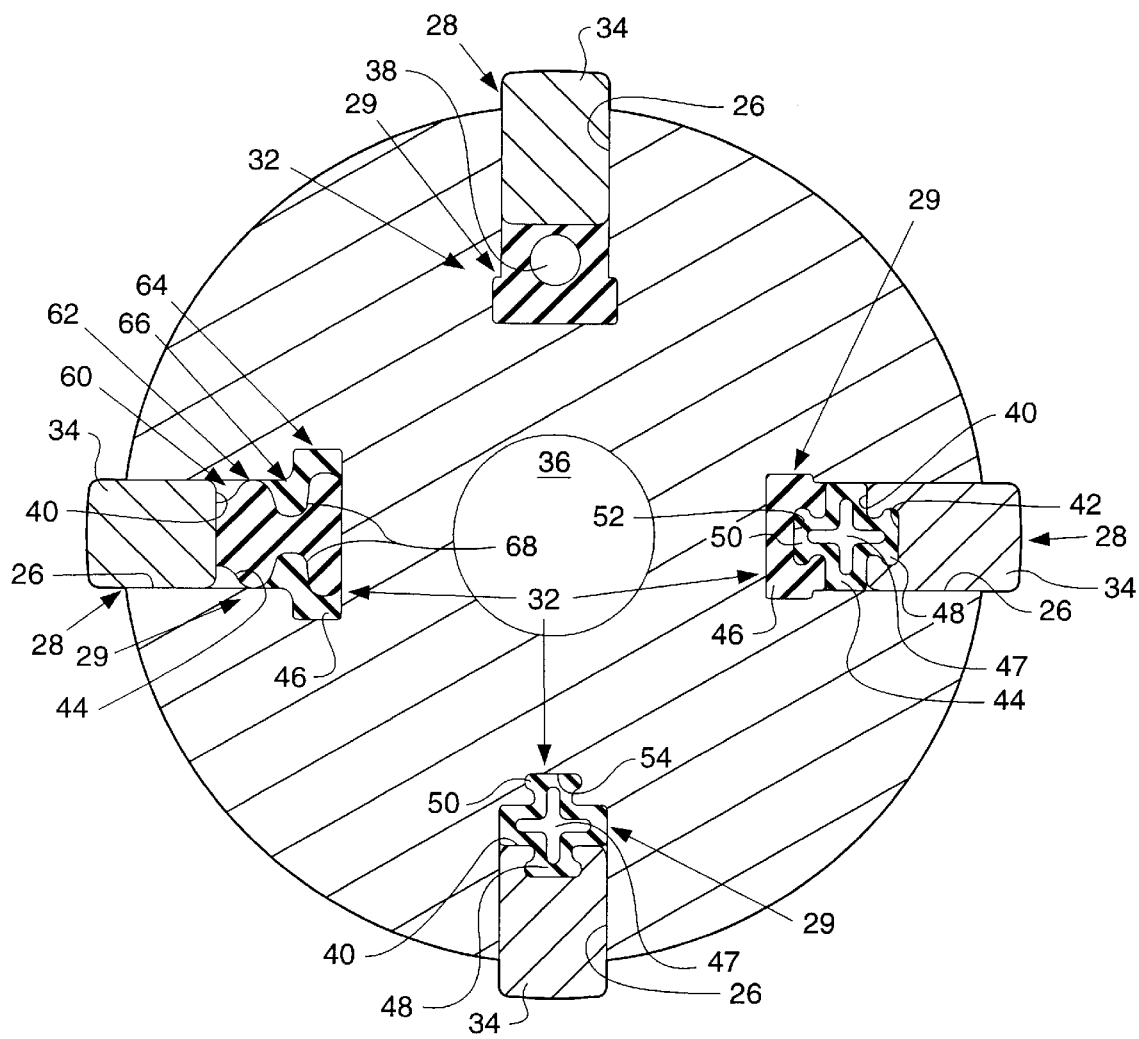
FIG. 4 is a partial section taken along line 3—3 of FIG. 2 and illustrates various embodiments of a portion of the subject invention.

Referring to FIG. 4, several other embodiments of the subject plurality of slots 26 and associated resilient members 32 are illustrated. Like elements have like element numbers. It is recognized that normally all of the plurality of slots 26 and the associated resilient members 32 are the same in each boring bar. The various embodiments in FIG. 4 are for illustrative purposes only. However, if desirable, various arrangements could be used in each slot if the resilient members have substantially the same compressive rates.

As viewed in FIG. 4, the guide arrangement at the top of FIG. 4 has the slot 26 with the upper portion 28 having the predetermined width and the lower portion 29. The guide member 34 is disposed in the upper portion of the slot 26. The bottom portion 29 of the slot 26 is generally tee shaped with the narrower part of the tee shaped slot being adjacent the upper portion 28 and having substantially the same width. The resilient member 32 has the same shape of the resilient member 32 of FIG. 2 and conforms to and mates with the lower portion 29 of the slot 26 but is modified by having a cavity or hole 38 defined therein generally parallel with the longitudinal length of the boring bar arrangement 12. The resilient member 32 is secured to the hardened guide member by a bonding or mechanical process.

Referring to the guide arrangement at the right side of FIG. 4, another embodiment is illustrated. The upper portion 28 and the lower portion 29 of the slot 26 are the same as that of the upper slot of FIG. 4. The hardened guide member 34 of subject embodiment has a bottom surface 40. A generally tee shaped groove 42 is defined in the guide member 34 adjacent to the bottom surface 40. The widest part of the tee shaped groove in the hardened guide member 34 is spaced from the bottom surface 40.

The resilient member 32 of the subject embodiment has two members 44,46. The first member 44 has a width that is larger than the width of the narrowest part of the lower portion 29 and a cavity 47 extending therethrough. A first protrusion 48 extends from the side of the first member 44 adjacent to the hardened guide member 34 and another protrusion 50 extends from the opposite side. Each of the first and second protrusion 48,50 has a generally tee shaped configuration. The first protrusion 48 conforms to and mates with the generally tee shaped groove 42 in the hardened guide 34.

The second member 46 is disposed in the lower portion 29 on the side thereof opposite to the hardened guide member 34. The second member 46 has an outer shape that conforms to and mates with the lower portion 29 of the slot 26. A generally tee shaped slot 52 is defined in the second member 46 and located on the side thereof adjacent the second protrusion 50 of the first member 44. The tee shaped slot 52 in the second member conforms to and mates with the second protrusion 50 of the first member 44.

Referring to the guide arrangement at the bottom of FIG. 4, another embodiment is illustrated. The upper portion 28 of the slot 26 is the same as that of the upper slot of FIG. 4. The lower portion 29 of the subject embodiment is different. The lower portion 29 has a portion thereof adjacent the upper portion 28 that is substantially the same width as the upper portion 28. The remaining portion of the lower portion 29 has a tee shaped slot 54 defined therein. The widest portion of the tee shaped slot 54 is narrower than the width of the first portion of the tee shaped slot 54 and spaced from the first portion thereof.

The hardened guide member 34 of subject embodiment has a bottom surface 40 with the generally tee shaped groove 42 defined therein adjacent to the bottom surface 40. The widest part of the tee shaped groove in the hardened guide member 34 is spaced from the bottom surface 40.

The resilient member 40, as set forth and described with respect to the right part of FIG. 4, is disposed generally in the lower portion 29 of the slot 26 adjacent to the bottom surface 40 of the hardened guide member 34. The first protrusion 48 of the member 44 conforms to and mates with the tee shaped groove 42 of the hardened guide member 34 and the second protrusion 50 thereof conforms to and mates with the tee shaped slot 52 of the lower portion 29.

Referring to the guide arrangement at the left side of FIG. 4, another embodiment is illustrated. The upper portion 28 and the lower portion 29 of the slot 26 are generally the same as that of the upper slot of FIG. 4. The lower portion 29 of the slot 26 is a tee shaped slot like that of the lower portion 29 of the top of the FIG. 4 except the relative relationship between the narrowest part and the widest part of the tee shaped slot, as illustrated, is different. It is recognized that the relative relationship of each of the tee shaped slots set forth herein in any of the embodiments could be different without departing from the essence of the subject invention. The hardened guide member 34 of subject embodiment has a bottom surface 40.

The resilient member 32 of the subject embodiment has first and second members 44,46 as set forth with respect to that illustrated on the right side of FIG. 4 but are somewhat different in shape. The first member 44 has a first portion 60 that is narrower than the narrower portion of the tee shaped slot of the lower portion 29, a second portion 62 integrally formed with the first portion 60 and has a width greater than the width of the narrower portion of the tee shaped slot 26, a third portion 64 spaced from the second portion 62 and has a width greater than the width of the narrower portion of the tee shaped slot 26, and a fourth portion 66 integrally formed between the second and third portion 62,64 and has a width narrower than the width of the narrower portion of the tee shaped slot 26. The first portion 60 of the first member 44 is connected to the bottom surface 40 of the hardened guide member 34 by a bonding process. The fourth portion 66 of the first member 44 is in intimate contact with the bottom of the lower portion 29 of the slot 26.

The second member 46 has an outer peripheral shape that generally coincides with the shape of the bottom portion of the respective slots of the plurality of slots 26 and the second element 46 has an inner cavity 68 defined therein that conforms to and mates with the shape of the third and fourth portions 64,66 of the first element 44.

It is recognized that various alternatives could be used in the subject arrangements without departing from the essence of the subject invention. For example, the first and second members 44,46 of the right and left sides of FIG. 4 could be made from the same type of resilient material or they could be made from different resilient materials. As previously set forth, the shape and sizes of the respective tee shaped slots could vary. More specifically, the tee shaped slots could be in the form of a well known dovetail slot. Other shapes and styles could be used as long as they provide a mechanical interlock between the associated elements.

INDUSTRIAL APPLICABILITY

During use of the boring tool assembly 10 illustrated in the drawings, the cutting tool 14 begins to machine the cored passage 18 of the member 16 to generated the machined bore 20. As is well known, when boring a cored passage or boring a long hole, the cutting tool 14 has a tendency to wander or follow the path of least resistance and not bore a straight hole.

As the cutting tool 14 travels further into the member 16, the hardened guide members 34 enter the machined bore 20. Prior to the hardened guide members 34 entering the machined bore 20, the diameter defined by the hardened guide members 34 is greater than the diameter of the machined bore 20. Consequently, the hardened guide members 34 are forced inwardly against the bias of the resilient members 32. The biasing forces created by the resilient members 32 maintain the boring bar 12 in concentric alignment with the machined bore 20. By maintaining the boring bar 12 concentric with the machined bore 20, the cutting tool 14 is also maintained concentric with the machined bore 20. This alignment ensures that the cutting tool 14 continue to bore the cored passage 18 in a straight line. This type of cutting tool lets the guide pads engage to stabilize the cutting forces of the boring bar and thus eliminating vibration during the cut.

The hardened guide members 34 can adjust inwardly or outwardly as needed to compensate for the change in the effective diameter of the cutting tool 14 while still maintaining the cutting tool 14 concentric with the machined bore 20. The changes to the outer diameter of the cutting tool 14 can be attributed to wear from use, re-sharpening or by the cutting tool being replaced with another cutting tool having a slightly different diameter.

Since the hardened guide members 34 have sufficient longitudinal length, at least a portion of their longitudinal length is always in contact with the machined bore 20 to ensure that the cutting tool 14 is machining a straight hole.

The operation of the various embodiments illustrated in FIG. 4 is the same as that set forth above. The arrangement illustrated in FIG. 2 teaches one type of connection of the resilient member 32 with respect to mechanically securing the hardened guide member 34 and the resilient member 32 to the boring bar 12. The resilient member illustrated at the top of the FIG. 4 drawing provides a cavity or hole 38 therein which permits additional space for the resilient material 32 to flow during compression thereof. The resilient material 32 is mechanically secured in the slot 26 like that of FIG. 2.

The resilient member 32 of the embodiment illustrated at the bottom of FIG. 4 teaches a mechanical interlock between both the hardened guide member 34 and the bottom of the tee shaped slot of the lower portion 29 of the slot 26. The subject embodiment also has a cavity 47 therein which also functions to provide, if needed, additional space for the resilient material to flow during compression.

The resilient member 32 of the embodiment illustrated at the right side of FIG. 4 teaches a resilient member 32 that is composed of two members 44,46. The second member 46 being disposed in and mechanically locked in the tee shaped slot of the lower portion 29 of the slots 26 and the first member 44 being interlocked with both the hardened guide member 34 and the second member 46.

The resilient member 32 of the embodiment illustrated at the left side of FIG. 4 teaches a resilient member 32 that is also composed of two members 44,46. However, the two members of the resilient member 32 of the left side of FIG. 4 are different. The first member 44 is bonded to the bottom surface 40 of the hardened guide member 34 and spans the space between the bottom surface 40 of the hardened guide member 34 and the bottom of the lower portion 29 of the slot 26. The third portion 64 of the first member 44 is mechanically locked in the slot 26 by the second member 46. The second member 46 could be slid into place during assembly or it could be injected in place by an injection process after the hardened guide member 34 and the first member 44 are placed in their assembled positions. By having the first member 44 span the space between the hardened guide member 34 and the bottom of the lower portion 29, a more controlled compressive force can be maintained. Likewise, since the first portion 60 of the first member 44 is narrower than the width f the upper portion 28 of the slot 26, there is ample space for the resilient material to flow into during operation, if needed.

In view of the foregoing, it is readily apparent that the present invention provides a boring tool assembly 10 that ensure a bored hole is machined straight even if the hole to be bored is interrupted with cavities and/or has interrupted surfaces. Additionally, the subject invention provides a guide arrangement that has a resilient member 34 disposed in the respective slots 26 of the boring tool assembly 10 and is mechanically interlocked within the respective slots 26. This permits the boring tool assembly to be rebuilt without have to apply heat that is normally used to braze in guide members.

Other aspects, objects and advantages of this invention can be obtained from a study of the drawings, the disclosure and the appended claims.

What is claimed is:

1. A boring tool assembly adapted to have a cutting tool disposed on one end thereof to cut a hole of a predetermined size in a member, the boring tool assembly comprising:
   a longitudinally extending boring bar having a plurality of slots defined therein about its circumference along its longitudinal length, each of the slots has a top portion of a predetermined width, a bottom portion and opposed side walls;
   a hardened guide member having a predetermined width substantially the same as the width of the upper portion of the respective slots and being disposed in the top portion of each of the respective slots of the plurality of slots; and a resilient member disposed in the bottom portion of each of the respective slots, each of the respective resilient members being mechanically connected within the bottom portion of the associated slot.

2. The boring tool assembly of claim 1 wherein the bottom portion of each of the plurality of slots is tee shaped slot and the respective resilient members are disposed in the respective tee shaped slots.

3. The boring tool assembly of claim 2 wherein each of the resilient members has a cavity defined therein extending generally parallel with the longitudinal length of the boring tool assembly.

4. The boring tool assembly of claim 2 wherein the respective resilient members are each secured to the associated guide member by bonding.

5. The boring tool assembly of claim 1 wherein the respective resilient members are secured to the associated guide member by a mechanical connection.

6. The boring tool assembly of claim 5 wherein the each of the hardened guide members has a bottom surface and each has a generally tee shaped groove defined therein adjacent to the bottom surface, the widest part of the tee shaped groove is spaced from the bottom surface of the respective hardened guide members and the associated resilient member has a generally tee shaped protrusion extending therefrom, the tee shaped protrusion conforms to and mates with the tee shaped groove in the hardened guide member.

7. The boring tool assembly of claim 1 wherein the bottom portion of each of the slots includes a first portion that has a width that is substantially the same as the width of the upper portion of the respective slots and a second portion that has a generally tee shaped slot with the widest part of the tee shaped slot being narrower than the width of the first portion with the widest part of the tee shaped slot being spaced from the first portion of the bottom portion.

8. The boring tool assembly of claim 7 wherein each of the respective resilient members has a generally tee shaped protrusion extending therefrom and in mating engagement with the generally tee shaped slot of the second portion of the bottom portion.

9. The boring tool assembly of claim 2 wherein the width of the narrower portion of the tee shaped slot coincides with the width of the upper portion of the respective slots and each of the resilient members being composed of two elements, the first element having a first portion that is narrower than the narrower portion of the tee shaped slot and connected to the hardened guide member, a second portion integrally formed with the first portion and having a width greater than the width of the narrower portion of the tee shaped slot, a third portion spaced from the second portion and having a width greater than the width of the narrower portion of the tee shaped slot, and a fourth portion integrally formed between the second and third portion and having a width narrower than the width of the narrower portion of the tee shaped slot.

10. The boring tool assembly of claim 9 wherein the second element has an outer peripheral shape that generally coincides with the shape of the bottom portion of the respective slots of the plurality of slots and the second element has an inner cavity defined therein that conforms to and mates with the shape of the third and fourth portions of the first element.

11. The boring tool assembly of claim 2 wherein the width of the narrower portion of the tee shaped slot coincides with the width of the upper portion of the respective slots and each of the resilient members being composed of two elements, the first element having a first portion with a width that coincides with the width of the upper portion of the respective slots and being connected to the bottom surface of the associated hardened guide members and a second portion that is generally tee shaped with the widest part of the tee being smaller than the width of the upper portion and spaced from the first portion of the first element and the second element has a shape that substantially conforms with the shape of the bottom portion of the respective slots and has a generally tee shaped slot defined therein that conforms to and mates with the second portion of the first element.

12. The boring tool assembly of claim 1 wherein the hardened guide member is made from one of a ceramic, a steel alloy and a carbide material and the resilient member is made from a polyurethane elastomeric rubber.

13. The boring tool assembly of claim 1 wherein the longitudinal length of the hardened guide member is more than four times greater than the diameter of the cutting tool.

* * * * *